US009368017B2

United States Patent
Hsu et al.

(10) Patent No.: US 9,368,017 B2
(45) Date of Patent: Jun. 14, 2016

(54) EARTHQUAKE EARLY WARNING METHOD BASED ON SUPPORT VECTOR REGRESSION

(71) Applicant: National Applied Research Laboratories, Taipei (TW)

(72) Inventors: Ting-Yu Hsu, New Taipei (TW); Shieh-Kung Huang, Taoyuan County (TW)

(73) Assignee: National Applied Research Laboratories, Taipei (TW)

( * ) Notice: Subject to any disclaimer, the term of this patent is extended or adjusted under 35 U.S.C. 154(b) by 443 days.

(21) Appl. No.: 14/011,753

(22) Filed: Aug. 28, 2013

(65) Prior Publication Data

US 2014/0249756 A1   Sep. 4, 2014

(30) Foreign Application Priority Data

Mar. 4, 2013  (TW) .............................. 102107515 A

(51) Int. Cl.
*G01V 1/00* (2006.01)
*G08B 21/10* (2006.01)
*G01V 1/28* (2006.01)

(52) U.S. Cl.
CPC ................ *G08B 21/10* (2013.01); *G01V 1/008* (2013.01)

(58) Field of Classification Search
CPC .................................. G01V 1/008; G08B 21/10
See application file for complete search history.

(56) References Cited

U.S. PATENT DOCUMENTS

| 7,702,598 B2 * | 4/2010 | Saidi | G06N 3/02 706/21 |
| 2002/0188424 A1 * | 12/2002 | Grinstein | G06F 17/3061 702/183 |

FOREIGN PATENT DOCUMENTS

CN   102621888   8/2012

OTHER PUBLICATIONS

Bose, 10.1785/0120110152 Rapid Estimation of Earthquake Source and Ground-motion Parameters for Earthquake Early Warning Using Data from a Single Three-Component Broadband or Strong-Motion Sensor Bulletin of the Seismological Society of America, vol. 102, No. 2, pp. 738-750, Apr. 2012.*

Böse, 10.1785/0120110152 Rapid Estimation of Earthquake Source and Ground-Motion Parameters for Earthquake Early Warning Using Data from a Single Three-Component Broadband or Strong-Motion Sensor, Bulletin of the Seismological Society of America, vol. 102, No. 2, pp. 738-750, Apr. 2012.

(Continued)

*Primary Examiner* — Phuong Huynh
(74) *Attorney, Agent, or Firm* — Winston Hsu; Scott Margo

(57) ABSTRACT

An earthquake early warning method for an earthquake detecting system includes utilizing support vector regression (SVR) method to build an earthquake detecting model according to the a plurality of vectors, wherein each of the vectors is corresponding to an earthquake information and a ground motion intensity; detecting a new earthquake information of a new earthquake and generating a specific vector according to the new earthquake information when the new earthquake occurs; and predicting a new ground motion intensity of the new earthquake according to the specific vector and the earthquake detecting model.

6 Claims, 4 Drawing Sheets

(56) References Cited

OTHER PUBLICATIONS

Wu An-xu, Zhang Yong-xian, Zhang Xiao-dong, Li Ping-an, Mu Hui-yong, Lu Ya-jun, "Study on model of support vector machine for synthetic prediction of seismic precursors", Earthquake, vol. 28, No. 3, Jul. 2008, Cover page, p. 56-60, Earthquake Administration of Beijing Municipality, Beijing 100080; China Earthquake Networks Center, CEA, Beijing 100045, China, Jul. 31, 2008.

Tan Kai, "Prediction of Earthquake in Yunnan Region Based on the Support Vector Machine", China Masters' Theses Full-text Database, Series of Information Technology, vol. 4, cover page, p. 7-9, 37-40, May 24, 2010.

Wang Wei et al., "Support Vector Machines and its Application Future in Earthquake Predication", Northwestern Seismological Journal, vol. 28, No. 1, cover page, p. 79-84, Mar. 31, 2006.

Claudio Satriano et al., "Earthquake early warning: Concepts, methods and physical grounds", Soil Dynamics and Earthquake Engineering, Jul. 2010, p. 1-13.

M. Akhoondzadeh, "Support vector machines for TEC seismo-ionospheric anomalies detection", Annales Geophysicae, p. 173-186, Feb. 6, 2013.

* cited by examiner

EARTHQUAKE EARLY WARNING METHOD BASED ON SUPPORT VECTOR REGRESSION

BACKGROUND OF THE INVENTION

1. Field of the Invention

The present invention relates to an earthquake early warning method based on support vector regression, and more particularly, to an earthquake early warning method capable of predicting the ground motion intensity of an earthquake according to earthquake initial waves a few seconds after the earthquake arrives and an earthquake detecting model built by a support vector regression method.

2. Description of the Prior Art

When an earthquake occurs, a regional earthquake early warning technology can disseminate earthquake warning seconds to tens of seconds before the strong shaking wave of the earthquake arrives via predicting the effects (intensities) and the onset time of the earthquake (e.g. the onset time of the earthquake is later if the distance from the epicenter is farther), so as to adopt essential contingency measures. Since the conventional regional earthquake early warning technology requires multiple earthquake detecting stations and earthquake initial waves information a few seconds after the earthquake arrives for completing predictions, the conventional regional earthquake early warning technology needs 20 seconds for disseminating the earthquake warning. If the velocity of the earthquake waves is 3 km per second, the region located from the epicenter within radius of at least 60 km will be the blind zone.

On the other hand, an on-site earthquake early warning technology utilizes earthquake initial waves a few seconds after the earthquake arrives at a single site to predict the earthquake intensity. However, the model to predict to final earthquake intensity is either too simple to acquire accurate earthquake intensity or too complex to be employed. A predict model with better accuracy and efficiency is needed.

SUMMARY OF THE INVENTION

Therefore, the present invention provides an earthquake early warning method capable of predicting the ground motion intensity of an earthquake according to earthquake initial waves a few seconds after the earthquake arrives and an earthquake detecting model built by a support vector regression method.

The present invention discloses an earthquake early warning method for an earthquake detecting system. The earthquake early warning method comprises utilizing support vector regression (SVR) method to build an earthquake detecting model according to the a plurality of vectors, wherein each of the vectors is corresponding to an earthquake information and a ground motion intensity; detecting new earthquake information of a new earthquake and generating a specific vector according to the new earthquake information when the new earthquake occurs; and predicting a new ground motion intensity of the new earthquake according to the specific vector and the earthquake detecting model.

The present invention further discloses an earthquake predicting system. The earthquake predicting system comprises a computing module, for utilizing support vector regression (SVR) method to build an earthquake detecting model according to a plurality of vectors; an earthquake detecting module, for detecting new earthquake information of a new earthquake and generating a specific vector according to the new earthquake information when the new earthquake occurs; and a ground motion intensity coefficient calculating module, for predicting a new ground motion intensity of the new earthquake according to the specific vector and the earthquake detecting model.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
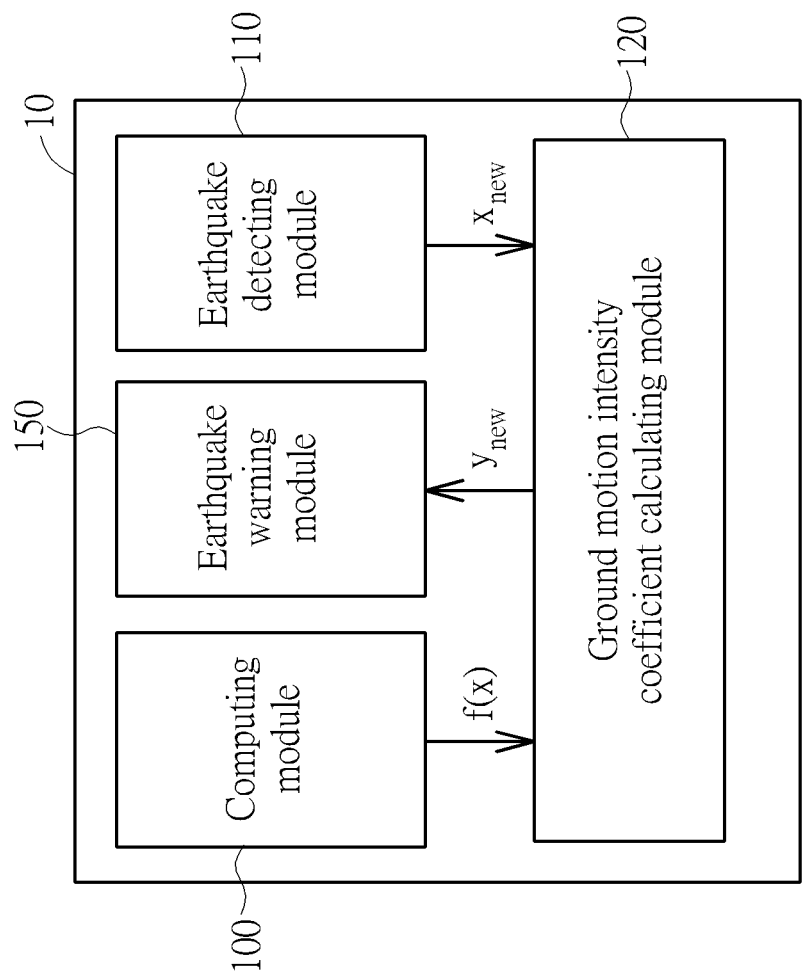
FIG. 1 is a schematic diagram of an earthquake detecting system according to an embodiment of the present invention.

Please refer to FIG. 1, which is a schematic diagram of an earthquake detecting system 10 according to an embodiment of the present invention. The earthquake detecting system 10 comprises a computing module 100, an earthquake detecting module 110, a ground motion intensity coefficient calculating module 120 and an earthquake warning module 150. The computing module 100 utilizes a support vector regression (SVR) method to build an earthquake detecting model f(x) according to vectors $x_1$-$x_m$, and then stores the earthquake detecting model f(x) in the ground motion intensity calculating module 120. Each vector $x_n$ ($1 \leq n \leq m$) of the vectors $x_1$-$x_m$ consists of earthquake information $Q_{n1}$-$Q_{nk}$ and corresponds to an intensity $y_n$. The input of the earthquake detecting model f(x) is a vector with the same dimension of the vectors $x_1$-$x_m$. When a new earthquake NE occurs, the earthquake detecting module 110 detects new earthquake information $N_1$-$N_k$ of the new earthquake NE, generates a specific vector $x_{new}$ according to the new earthquake information $N_1$-$N_k$ and transmits the specific vector $x_{new}$ to the ground motion intensity coefficient calculating module 120. The ground motion intensity coefficient calculating module 120 utilizes the specific vector $x_{new}$ as the input of the earthquake detecting model f(x) and calculates a new intensity $y_{new}$ of the new earthquake NE. The earthquake warning module 150 then determines whether to disseminate an earthquake warning according to the new intensity $y_{new}$.

In detail, the support vector regression method projects the vectors $x_1$-$x_m$ to a high-dimensional characteristic space H and performs a linear regression in the high-dimensional characteristic space H. The computing module 100 therefore assumes the earthquake detecting model f(x) as the following:

$$f(x) = \langle w, g(x) \rangle + b \quad (1)$$

wherein "w" is a vector of the high-dimensional characteristic space H, "g(x)" is a nonlinear projection which projects the input x to the high-dimensional characteristic space H, "$\langle \ \rangle$" is an inner product mathematical operation and "b" is a constant. Via substituting slack variables and regression risks, the computing module 100 derives the equation (1) to a target function shown as the following:

$$\min_{\omega,b,\xi,\xi^*}\left[\frac{1}{2}\|w\|^2+\frac{C}{m}\sum_{i=1}^{m}(\xi_i+\xi^*)\right] \quad (2)$$

which is limited by $\langle w,x_i\rangle+b-y_i\leq\epsilon+\xi_i,\ y_i-\langle w,x\rangle-b\leq\epsilon+\xi_i^*$ and $\xi_i,\xi_i^*\geq 0$,
$i=1,\ldots,m;$ wherein "C" is a constant, and "$\xi_1$-$\xi_m$", "$\xi_1^*$-$\xi_m^*$" and "b" are variables of the target function (i.e. the equation (2)). The computing module 100 further utilizes Lagrange multipliers $\alpha_1$-$\alpha_m$, $\beta_1$-$\beta_m$ for converting the equation (2) to a quadratic programming shown as the following:

$$\max_{\alpha,\beta}\left[-\frac{1}{2}\sum_{i=1}^{m}\sum_{j=1}^{m}(\alpha_i-\beta_i)(\alpha_j-\beta_j)k(x_i,x_j)-\right.$$
$$\left.\varepsilon\sum_{i=1}^{m}(\alpha_i+\beta_i)+\sum_{i=1}^{m}y_i(\alpha_i-\beta_i)\right] \quad (3)$$

The equation (3) is constrained by $$\sum_{i}^{m}(\alpha_i-\beta_i)=0 \text{ and } 0\leq\alpha_i,\beta_i\leq\frac{C}{m};$$

wherein "$\epsilon$" is a constant. Similarly, the computing module 100 utilizes the Lagrange multipliers $\alpha_1$-$\alpha_m$, $\beta_1$-$\beta_m$ to convert the equation (1) to the following equation:

$$f(x)=\left[\sum_{i=1}^{m}(\alpha_i-\beta_i)k(x,x_i)\right]+b^* \quad (4)$$

Wherein "b*" is a constant, function k is a kernel function shown as the following:

$k(x_i,x_j)=\exp(-\|x_i-x_j\|^2/2\sigma^2) \quad (5)$

Wherein "$\sigma$" is a constant, "$\|\ \|$" represents the Euclidean norm. The computing module 100 substitutes the vectors $x_1$-$x_m$ (i.e. the earthquake information $Q_{n1}$-$Q_{nk}$) and the intensities $y_1$-$y_m$ corresponding to the vectors $x_1$-$x_m$ into the equation (3) and the equation (4), and then the Lagrange multipliers $\alpha_1$-$\alpha_m$, $\beta_1$-$\beta_m$ can be acquired. Next, the constant b* is acquired by substituting the vector $x_n$ and the intensity $y_n$, which fits $\alpha_n\neq 0$ and $$b^*=y_n-\sum_{i=1}^{m}(\alpha_i-\beta_i)k(x_i,x_n)-\varepsilon \quad (6)$$

into the following equation:

$$\alpha_n\neq\frac{C}{m},$$

Finally, the computing module 100 determines the constants C, $\epsilon$ and $\sigma$ according to the vectors $x_1$-$x_m$.

According to the above embodiment, the computing module 100 builds the earthquake detecting model f(x) (i.e. the equation (4)) according to the vectors $x_1$-$x_m$ (i.e. the earthquake information $Q_{n1}$-$Q_{nk}$) and the intensities $y_1$-$y_m$ thereof via the support vector regression method, and then stores the earthquake detecting model f(x) in the ground motion intensity coefficient calculation module 120. When the new earthquake NE occurs, the earthquake detecting module 110 detects the new earthquake information $N_1$-$N_k$ of the new earthquake NE, to generate the specific vector $x_{new}$. The ground motion intensity coefficient calculating module 120 then substitutes the specific vector $x_{new}$ into the earthquake detecting model f(x) to acquire the new intensity $y_{new}$ of the new earthquake (i.e. $y_{new}$=f($x_{new}$)).

Please note that, the computing module 100, the earthquake detecting module 110 and the ground motion intensity coefficient calculating module 120 of the earthquake early warning system 10 may locate at different locations and may communicate with each other via a wired network or a wireless network. For example, the computing module 100 may locate at the earthquake information centre for acquiring massive earthquakes $Q_{n1}$-$Q_{nk}$, to improve the accuracy of the earthquake detecting model f(x). The earthquake detecting module 110 may locate at the region where the earthquake occurs frequently, for detecting the new earthquake information $N_1$-$N_k$ rapidly. The ground motion intensity coefficient calculating module 120 may locate at the warning centre, so as to determine whether to disseminate the earthquake warning immediately. Besides, the intensity is utilized for illustrating the concept of the above embodiment and is not utilized for limiting the scope of the present invention. For example, the method of the above embodiment can be utilized for predicting coefficients related to the intensity and the damage degree of the earthquake, such as a peak ground acceleration (PGA), a peak ground velocity (PGV), a peak ground displacement (PGD), a cumulative absolute velocity (CAV), an Arias intensity, a spectral intensity and a response spectra.

In addition, the solution of the support vector regression method (i.e. the equations (1)-(6)) is utilized for illustrating the concept of the above embodiment and is not utilized for limiting the scope of the present invention. Those skilled in the art may use other mathematical equations in cooperation with the support vector regression method to acquire equations for calculating the new ground motion intensity of the new earthquake NE.

In order to illustrate performance of the above embodiment, the new ground motion intensity $y_{new}$ of the new earthquake NE acquired by analyzed simulations is compared with the actual intensity of the new earthquake NE. Please note that, the intensity (I) of an earthquake is converted from the peak ground acceleration, thus the comparisons of the peak ground acceleration also can be utilized for illustrating the performance of the above embodiment. In this embodiment, the conversion equation between the intensity and the PGA is $$\log(PGA)=\left(\frac{I}{2}\right)-0.6$$

and the conversion equation between the intensity and the PGA may be different in different countries. The conversion equations between the intensity and the PGA in other countries are also suitable to the above embodiment and do not affect the performance.

Figure 2:
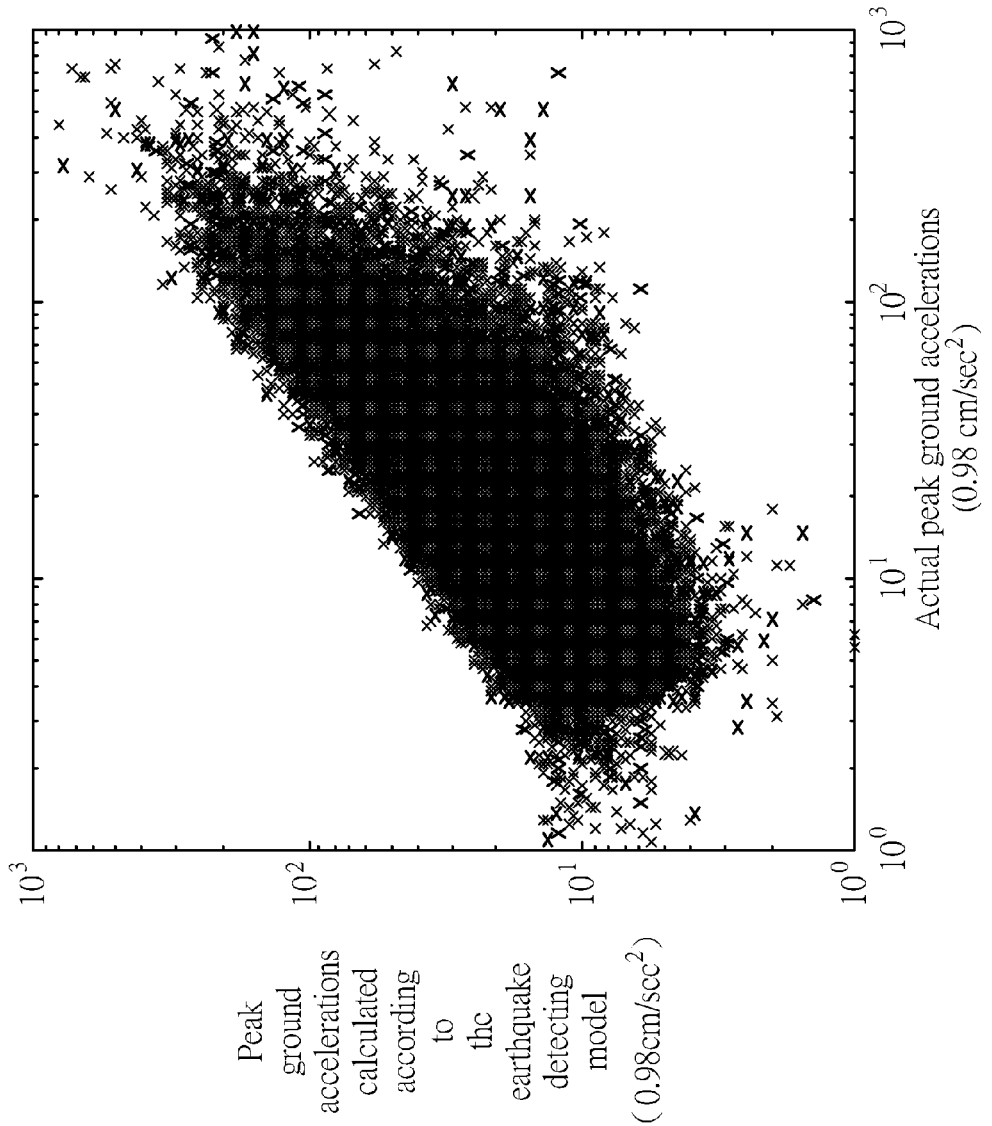
FIG. 2 is a comparison chart of true peak ground acceleration and a peak ground accelerations calculated by an earthquake detecting model.

Please refer to FIG. 2, which is a comparison chart between the peak ground accelerations calculated according to the earthquake detecting model f(x) and the actual peak ground accelerations. The testing conditions in FIG. 2 comprise: vectors $x_1$-$x_{91142}$ generated according to 91142 data of the earthquake records provided by Taiwan Central Weather Bureau and intensities $y_1$-$y_{91142}$ corresponding to the vectors $x_1$-$x_{91142}$, wherein each vector $x_n$ ($1 \le n \le 91142$) comprises a peak acceleration, a peak velocity, a peak displacement, a predominate period, a cumulative absolute velocity and integral squared velocity (acquired from initial 3 seconds of the vertical initial waves). As shown in FIG. 2, the peak ground accelerations calculated according to the earthquake detecting model f(x) are highly close to the actual peak ground accelerations and the percentage of the prediction with intensity errors within plus one level or minus one level (i.e. a predict ratio) reaches up to 99.22%.

Figure 3:
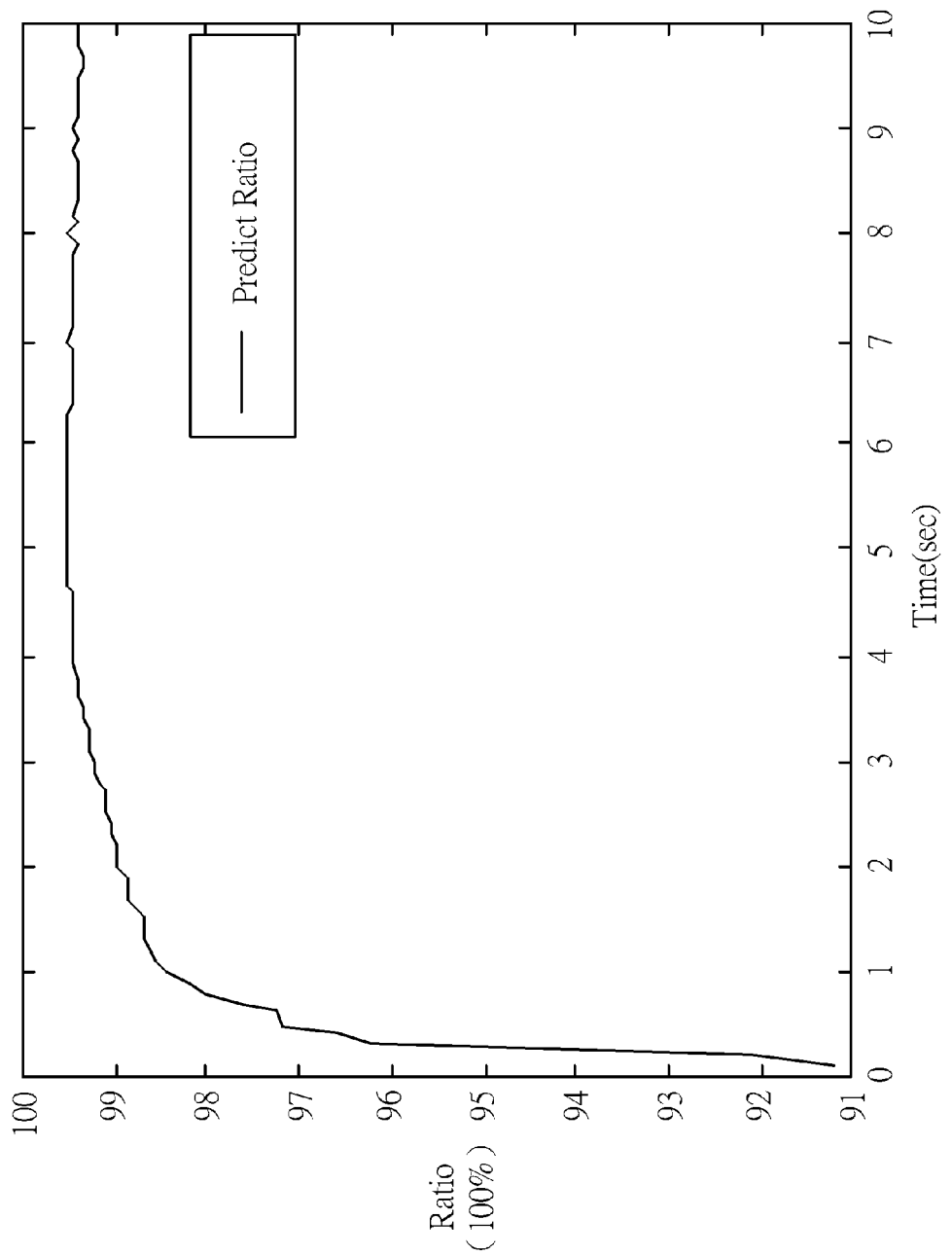
FIG. 3 is a chart of the percentage of the prediction with intensity errors within plus one level or minus one level and the time of observing the vertical initial waves

Please refer to FIG. 3, which is a chart between the percentage of the prediction with intensity errors within plus one level or minus one level and the time of observing the vertical initial waves. The range of the time of observing the vertical initial waves is from 0.1 to 10 seconds, and interval between two sample points is 0.1 seconds. As shown in FIG. 3, the predict ratio increases as the time of observing the vertical initial waves. The earthquake detecting model f(x) in the above embodiment has a high accuracy even the time of observing the vertical initial waves is only 0.1 seconds, however. As shown in FIG. 3, the predict ratio reaches up to 91.24% when the time of observing the vertical initial waves is 0.1 seconds. Moreover, when the time of observing the vertical initial waves increases to 0.4 seconds, the prediction ratio arises to 97.19%. As can be seen from the above, the method disclosed in the above embodiment can utilize extremely short time of observing only the vertical initial waves for achieving high prediction accuracy. The warning blind zone can be shrunk effectively and valuable reaction time can be acquired.

Figure 4:
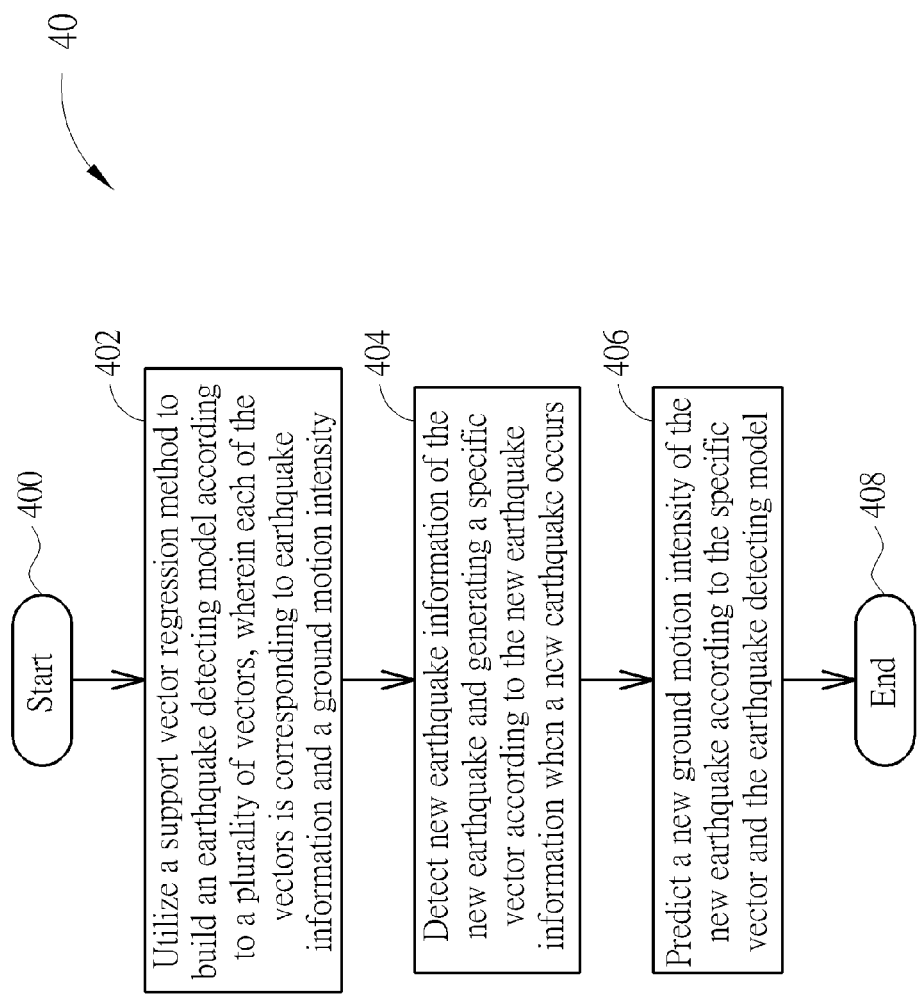
FIG. 4 is a flowchart of an earthquake detecting process according to an embodiment of the present invention.

The above-mentioned operations of the earthquake detecting system 10 can be further summarized into an earthquake detecting process 40 as shown in FIG. 4. The earthquake detecting process 40 comprises the following steps:

Step 400: Start.

Step 402: Utilize a support vector regression (SVR) method to build an earthquake detecting model according to a plurality of vectors, wherein each of the vectors is corresponding to earthquake information and a ground motion intensity.

Step 404: Detect new earthquake information of the new earthquake and generating a specific vector according to the new earthquake information when a new earthquake occurs.

Step 406: Predict a new ground motion intensity of the new earthquake according to the specific vector and the earthquake detecting model.

Step 408: End.

The detailed operations and related alternations can be known by referring to the above, and are not narrated herein for brevity.

In the prior art, since the conventional regional earthquake early warning technology requires multiple earthquake detecting stations and earthquake initial waves information a few seconds after the earthquake arrives for completing predictions, the conventional regional earthquake early warning technology needs 20 seconds for disseminating the earthquake warning. If the velocity of the earthquake waves is 3 km per second, the region located from the epicenter within radius of at least 60 km will be the blind zone. On the other hand, the conventional earthquake on-site early warning technology utilizes earthquake records of few representative earthquakes for verifying the usability thereof. The performance of the conventional earthquake on-site early warning technology in practical applications is unknown, thus a considerable misjudging possibility may be obtained when utilizing the conventional earthquake on-site early warning technology in the practical applications. Some of the conventional earthquake on-site early warning technology use different method to build a predict model, but the methods are too complex to be employed. In comparison, the earthquake early warning method of the above embodiments can accurately predict the intensity of the earthquake via using the earthquake initial waves a few seconds after the earthquake arrives and the earthquake detecting model built by the support vector regression method with ease.

To sum up, the earthquake early warning method of the above embodiments utilizes the support vector regression method to build the earthquake detecting model according to the established earthquake information and the intensities thereof, and utilizes the earthquake detecting model to early detect the intensity of the new earthquake according to the earthquake initial waves a few seconds before the new earthquake occurs when the new earthquake occurs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An earthquake early warning method for an earthquake detecting system comprising:
   utilizing a support vector regression (SVR) method to build an earthquake detecting model according to a plurality of vectors, wherein each of the vectors is corresponding to an earthquake information and a ground motion intensity;
   detecting new earthquake information of a new earthquake and generating a specific vector according to the new earthquake information when the new earthquake occurs;
   predicting a new ground motion intensity of the new earthquake according to the specific vector and the earthquake detecting model; and
   disseminating an earthquake warning according to the new ground intensity;
   wherein the earthquake information comprises at least one of a peak acceleration, a peak velocity, a peak displacement, a predominate period, a cumulative absolute velocity and integral squared velocity of an earthquake initial wave of each of a plurality of earthquake records;
   wherein the new earthquake information comprises at least one characteristic value of a new earthquake initial wave of the new earthquake corresponding to the earthquake information;
   wherein the step of predicting the new ground motion intensity of the new earthquake according to the specific vector and the earthquake detecting model is performed according to the following equation:

$$y_{new} = f(x_{new}) = \left[\sum_{i=1}^{m}(\alpha_i - \beta_i)k(x_{new}, x_i)\right] + b^*;$$

wherein $y_{new}$ is the new ground motion intensity, $x_1$-$x_m$ are the plurality of vectors, $x_{new}$ is the specific vector, $\alpha_1$-$\alpha_m$, $\beta_1$-$\beta_m$ and $b^*$ are coefficients derived according to the support vector regression, the plurality of vectors and the ground motion intensity corresponding to the plurality of vectors, and function k is a kernel function corresponding to a high-dimensional characteristic space;

wherein the kernel function is $k(x_i,x_j)=\exp(-\|x_i-x_j\|^2/2\sigma^2)$, where $\sigma$ is a constant;

wherein the coefficients $\alpha_1$-$\alpha_m$, $\beta_1$-$\beta_m$ are acquired via solving a quadratic programming and the quadratic programming is $$\max_{\alpha,\beta}\left[-\frac{1}{2}\sum_{i=1}^{m}\sum_{j=1}^{m}(\alpha_i-\beta_i)(\alpha_j-\beta_j)k(x_i,x_j)-\varepsilon\sum_{i=1}^{m}(\alpha_i+\beta_i)+\sum_{i=1}^{m}y_i(\alpha_i-\beta_i)\right],$$

which is limited by $$\sum_i^m(\alpha_i-\beta_i)=0 \text{ and } 0\leq\alpha_i,\beta_i\leq\frac{C}{m};$$

wherein $y_1$-$y_m$ are the ground motion intensities corresponding to the plurality of vectors and $\epsilon$、$C$ are constants;

wherein the quadratic programming is acquired according to a target function with Lagrange multipliers, and the target function is $$\min_{\omega,b,\xi,\xi^*}\left[\frac{1}{2}\|w\|^2+\frac{C}{m}\sum_{i=1}^{m}(\xi_i+\xi_i^*)\right],$$

which is constrained by $\langle w,x_i\rangle+b-y_i\leq\epsilon+\xi_i$, $y_i-\langle w,x_i\rangle-b\leq\epsilon+\xi_i^*$ and $\xi_i,\xi_i^*\geq 0$, $i=1,\ldots,m$;

wherein w is a vector in the high-dimensional characteristic space, and $\xi_1$-$\xi_m$, $\xi_1^*$-$\xi_m^*$ and b are variables of the target function.

2. The earthquake early warning method of claim 1, wherein the step of detecting the new earthquake information of the new earthquake and generating a specific vector according to the new earthquake information when the new earthquake occurs comprises:

detecting the new earthquake information of the new earthquake and generating a specific vector according to the new earthquake information in a specific time when the new earthquake occurs.

3. The earthquake early warning method of claim 1, wherein the ground motion intensity and the new ground motion intensity are one of an intensity, a peak ground acceleration, a peak ground velocity, a peak ground displacement, a cumulative absolute velocity, an Arias intensity, a spectral intensity and a response spectra.

4. An earthquake predicting system, comprising:

a computing module, for utilizing a support vector regression (SVR) method to build an earthquake detecting model according to a plurality of vectors wherein each of the vectors is corresponding to an earthquake information and a ground motion intensity;

an earthquake detecting module, for detecting new earthquake information of a new earthquake and generating a specific vector according to the new earthquake information when the new earthquake occurs;

a ground motion intensity coefficient calculating module, for predicting a new ground motion intensity of the new earthquake according to the specific vector and the earthquake detecting model; and an earthquake warning module, for determining whether to disseminate an earthquake warning according to the new ground intensity;

wherein the earthquake information comprises at least one of a peak acceleration, a peak velocity, a peak displacement, a predominate period, a cumulative absolute velocity and integral squared velocity of an earthquake initial wave of each of a plurality of earthquake records;

wherein the new earthquake information comprises at least one characteristic value of a new earthquake initial wave of the new earthquake corresponding to the earthquake information;

wherein the ground motion intensity coefficient calculating module predicts the new ground motion intensity of the new earthquake according to the specific vector and the earthquake detecting model according to the following equation:

$$y_{new}=f(x_{new})=\left[\sum_{i=1}^{m}(\alpha_i-\beta_i)k(x_{new},x_i)\right]+b^*;$$

wherein $y_{new}$ is the new ground motion intensity, $x_1$-$x_m$ are the plurality of vectors, $x_{new}$ is the specific vector, $\alpha_1$-$\alpha_m$, $\beta 1$-$\beta m$ and $b^*$ are coefficients derived according to the support vector regression, the plurality of vectors and the ground motion intensity corresponding to the plurality of vectors, and k is a kernel function corresponding to a high-dimensional characteristic space;

wherein the kernel function is $k(x_i,x_j)=\exp(-\|x_i-x_j\|^2/2\sigma^2)$, where $\sigma$ is a constant;

wherein the coefficients $\alpha_1$-$\alpha_m$, $\beta_1$-$\beta_m$ are acquired via solving a quadratic programming and the quadratic programming is $$\max_{\alpha,\beta}\left[-\frac{1}{2}\sum_{i=1}^{m}\sum_{j=1}^{m}(\alpha_i-\beta_i)(\alpha_j-\beta_j)k(x_i,x_j)-\varepsilon\sum_{i=1}^{m}(\alpha_i+\beta_i)+\sum_{i=1}^{m}y_i(\alpha_i-\beta_i)\right],$$

which is limited by $$\sum_i^m(\alpha_i-\beta_i)=0, 0\leq\alpha_i,\beta_i\leq\frac{C}{m};$$

wherein $y_1$-$y_m$ are the ground motion intensities corresponding to the plurality of vectors and $\epsilon$、$C$ are constants;

wherein the quadratic programming is acquired according to a target function with Lagrange multipliers, and the target function is $$\min_{\omega,b,\xi,\xi^*} \left[ \frac{1}{2}\|w\|^2 + \frac{C}{m}\sum_{i=1}^{m}(\xi_i + \xi^*) \right],$$

which is constrained by $\langle w,x_i \rangle + b - y_i \leq \epsilon + \xi_i$, $y_i - \langle w,x_i \rangle - b \leq \epsilon + \xi_i^*$, $\xi_i, \xi_i^* \geq 0$, $i=1, \ldots, m$;

wherein w is a vector in the high-dimensional characteristic space, and $\xi_1\text{-}\xi_m$, $\xi_1^*\text{-}\xi_m^*$ and b are variables of the target function.

5. The earthquake predicting system of claim 4, wherein the earthquake detecting module detects the new earthquake information of the new earthquake and generating a specific vector according to the new earthquake information in a specific time when the new earthquake occurs.

6. The earthquake predicting system of claim 4, wherein the ground motion intensity and the new ground motion intensity are one of the an intensity, a peak ground acceleration, a peak ground velocity, a peak ground displacement, a cumulative absolute velocity, an Arias intensity, a spectral intensity and a response spectra.

\* \* \* \* \*